United States Patent [19]

Rettig

[11] Patent Number: 5,717,889
[45] Date of Patent: Feb. 10, 1998

[54] COLLISON REDUCTION ALGORITHM FOR AN ETHERNET BACKOFF PROTOCOL

[75] Inventor: Daniel Rettig, Karkur, Israel

[73] Assignee: Intel Corporation, Santa Clara, Calif.

[21] Appl. No.: 498,005

[22] Filed: Jun. 30, 1995

[51] Int. Cl.[6] .................................. H04L 12/413
[52] U.S. Cl. ....................... 370/447; 370/462; 370/910
[58] Field of Search ........................... 370/229, 230, 370/445, 446, 447, 448, 910, 462

[56] References Cited

U.S. PATENT DOCUMENTS

| | | | |
|---|---|---|---|
| 4,506,361 | 3/1985 | Kume | 370/85 |
| 5,436,903 | 7/1995 | Yang et al. | 370/85.3 |

Primary Examiner—Douglas W. Olms
Assistant Examiner—Matthew C. Phillips
Attorney, Agent, or Firm—Blakely, Sokoloff, Taylor & Zafman

[57] ABSTRACT

An improved method for solving collisions in an Ethernet network. In one embodiment, the invention is implemented using circuitry that senses when the system cable is active. When a station on the network involved in a collision is implementing its collision backoff algorithm and the system cable becomes active, a Stop Backoff Logic comprising an AND gate provides a signal to stop the collision backoff algorithm counter until the system cable is again quiet.

14 Claims, 2 Drawing Sheets

# COLLISON REDUCTION ALGORITHM FOR AN ETHERNET BACKOFF PROTOCOL

FIELD OF THE INVENTION

The present invention relates to the field of collision reduction in Ethernet networks.

BACKGROUND OF THE INVENTION

Ethernet is a local communications system wherein multiple computer stations transmit and receive data along a single cable. Since the stations transmit and receive data (frames) along one cable, there must be control mechanism in place to allow a fair system for the stations to share the cable plant. In an Ethernet system, the control mechanism is an access method known as Carrier Sense Multiple Access with Collision Detection (CSMA/CD).

In an Ethernet network, before a station transmits a frame it first determines if a transmission is occurring from another station. If a station senses that the cable plant is busy (carrier sense signal on) it defers transmission of the frame until the cable is quiet. When the cable is quiet (carrier sense signal off), the deferring station immediately begins to transmit. Roughly speaking, if the station senses the network line to be at 0 volts, it assumes there is no traffic on the line and thus, can transmit it. On the other hand, if the DC voltage on the line is between approximately −0.2 volts and −1.4 volts, it is assumed that another station/is transmitting.

If multiple stations attempt to transmit at the same time, it is possible for them to interfere with each other's transmission, in spite of their attempts to avoid this by deferring. Collisions between transmitted signals occur in Ethernet networks in part because propagation delays and other delays, such as those associated with detecting the status of the line, prevent a station from precisely knowing when another station is transmitting. A collision is detected when the signal level on the cable is equal to or exceeds the combined signal level of two stations transmitting. In a correctly functioning system, collisions occur only within a short time interval following the start of transmission, since after this interval all stations will detect that the cable is busy and defer transmission.

Once a collision is detected within the Ethernet system, a signal is sent to the network controller board of each transmitting station involved in the collision. A jam signal is also emitted on the cable plant to ensure that all other stations on the network have seen the collision. At the end of enforcing a collision (jamming), the network controller at each station involved in the collision initiates the Ethernet backoff protocol (Backoff) by executing a binary exponential backoff algorithm which delays retransmission and backs off for a random amount of time. Note, however, that those stations not involved in the collision are immediately free to transmit once the collision jamming function has terminated. When the backoff time for a station involved in the collision has expired the station will exit Backoff and attempt to retransmit. If another station is transmitting when the backoff time expires, the network controller at the station will initiate the Ethernet Deferral protocol (Deferral) and defer transmission until the cable is quiet (carrier sense signal off).

Although the present method of solving collisions in an Ethernet system is well established, it can sometimes produce additional collisions, and, as a result, lower the overall performance of the network. For instance, if a station that was not involved in a collision begins to transmit after a collision has occurred and the frame being transmitted is larger in bit-times than the backoff time that remains to count on two or more of the collision participants that are in Backoff, a collision is likely to occur on the network. A collision is likely to occur because two or more of the collision participants will have exited Backoff and begun deferring during the transmission of the frame. As a result, those stations will stop deferring and immediately begin to transmit data frames at the same time when the cable goes quiet (carrier sense signal off).

As will be seen, the present invention enhances the performance of an Ethernet system by reducing the number of additional collisions that may occur when the system is recovering from a former collision event.

SUMMARY OF THE INVENTION

An Improved method for solving collisions in an Ethernet system is disclosed.

When a collision is detected on the Ethernet system the network controller at each station involved in the collision executes a binary exponential backoff algorithm which delay all future transmissions and backs off for a random amount of time as determined by a counter. If another station on the network begins to transmit (carrier sense signal on) while other stations involved in the collision are implementing their backoff algorithms, the backoff algorithm counter is stopped until the system cable is again quiet (carrier sense signal off). As a result, the present invention will reduce the number of collisions that will occur on the network by reducing the likelihood that two or more collision participants will emerge from a collision event and begin retransmitting at the same time.

In one embodiment, the invention is implemented using circuitry that senses when the system cable is active (carrier sense signal on). When a station involved in a collision is implementing its collision backoff algorithm and the system cable is active, a Stop Backoff Logic comprising a simple AND gate provides a signal to stop the collision backoff counter until the system cable is again quiet.

BRIEF DESCRIPTION OF THE DRAWINGS

The present invention is illustrated by way of example and is not limited by the figures of the accompanying drawings, in which like references indicate similar elements, and in which.

DETAILED DESCRIPTION

An improved method for solving collisions in an Ethernet system is described. In the following description, numerous specific details are set forth in order to provide a thorough understanding of the present invention. However, it will be obvious to one of skill in the art that the invention may be practiced without these specific details. In other instances, well known Ethernet elements and parameters have not been shown in particular detail in order to avoid unnecessarily obscuring the present invention.

Figure 1:
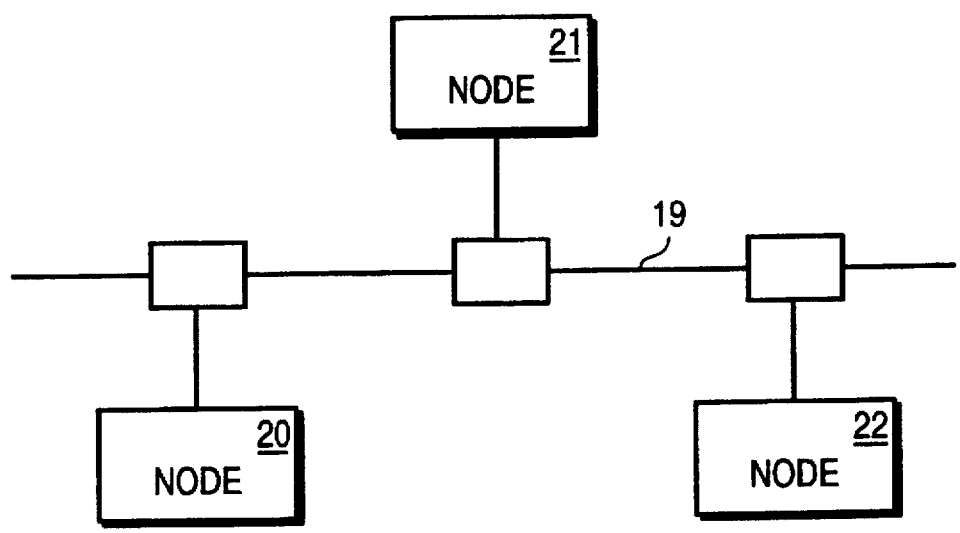
FIG. 1 illustrates a portion of an Ethernet network with three nodes/stations.

FIG. 1 illustrates a portion of an Ethernet network comprising a cable 19 and three network stations attached to the cable that are represented by nodes 20, 21 and 22. All stations on the network share cable 19, and transmissions from the stations can be received by any station attached to the cable. However, only one station may transmit data on the line at any given time. Each of stations 20, 21 and 22 is attached to cable 19 through an Ethernet network controller. The network controller is attached to cable 19 through the use of a transceiver known as the media access unit (MAU). The MAU contains the circuitry necessary to detect collisions on the cable plant.

As mentioned earlier, if multiple stations attempt to transmit data on cable 19 at the same time, it is possible that a collision will occur on the cable. If a collision is detected, the MAU sends a signal to the network controller of each station, indicating that a collision has taken place on the network. Each transmitting station that was involved in the collision will then invoke its respective binary exponential backoff algorithm which delays all future retransmissions for a random amount of time.

The amount of time that an Ethernet controller will back off is dependent on many factors. Simply stated, a retransmission delay time is randomly selected between zero and some upper limit (usually the amount of stations that are allowed on the network). This number is then multiplied by a second number known as the slot time. The slot time is typically slightly larger than the time it takes to transmit a 64-byte data frame. This product, known as the real time delay, is the amount of time that an Ethernet station will back off before retransmitting.

Figure 2:
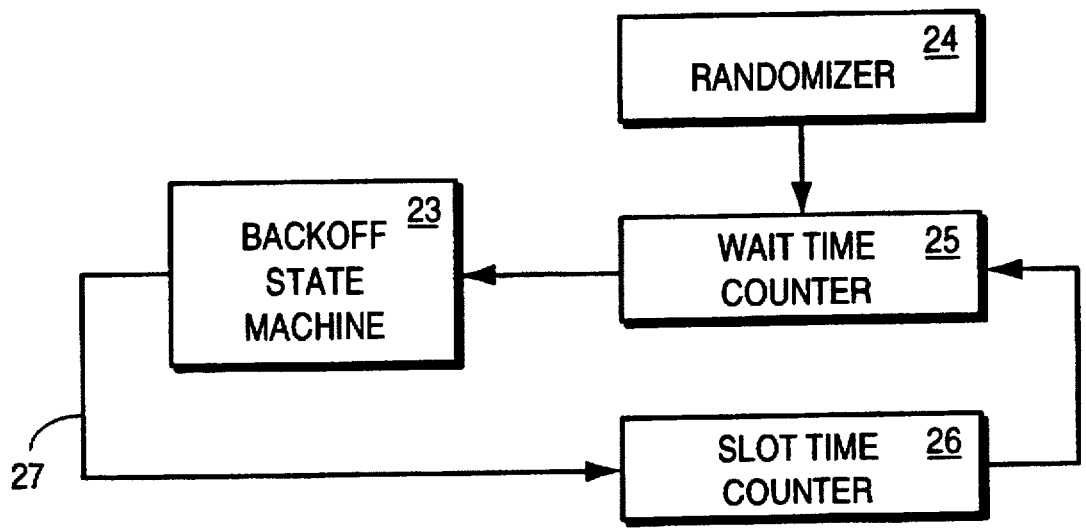
FIG. 2 illustrates a block diagram of the hardware that is currently used to implement the Ethernet backoff algorithm.

FIG. 2, illustrates a block diagram of the hardware that is currently used to implement the backoff algorithm in a controller that follows the IEEE 802.3 protocol. The hardware includes: backoff state machine 23, randomizer 24, wait time counter 25 and slot time counter 26. At the end of enforcing a collision (jamming), randomizer 24, which comprises a 17 bit linear feedback shift register (LSFR) and a masking window, chooses a random integer (r) in the range $0<r<2^k$, where $k= \min(n,10)$. The number generated by randomizer 24 is then loaded into wait time counter 25. Concurrently with selecting and loading the random number into counter 25, backoff state machine 23 sends signal 27 to enable slot time counter 26. While in Backoff, wait time counter 25 is decremented after the clocking of each slot time interval, as determined by slot time counter 26. When wait time counter 25 reaches zero counts, backoff state machine 23 enables the station's network controller to attempt retransmission of the data frame.

In accordance with the IEEE 802 standard, a station may attempt to retransmit a data packet for a maximum number of 16 times before the transmission of the data packet is aborted. After each attempted retransmission, randomizer 24 generates a new random number, r. For example, after the first collision is detected the LSFR implements a primary polynomial by sampling the 10 least significant bits into a register. Random number, r, is then generated by masking all but the least significant bit. If a second collision is detected the LSFR again samples the 10 least significant bits into a register, however, random number, r, is selected by masking all but the two least significant bits. After a third collision is detected all but the least three significant bits are masked. This process continues until the tenth collision where none of the bits that are loaded into the register are masked. As a result, the amount of time that a station backs off after each collision increases exponentially between the first and tenth collision.

As previously discussed, although the present method of solving collisions in an Ethernet system is well established, it can sometimes produce additional collisions, and as a result, reduce the overall network throughput. For instance, if a station that was not involved in a collision begins to transmit after a collision has occurred and the frame being transmitted is larger in bit-times than the backoff time that remains to count on two or more of the collision participants that are in Backoff, another collision is likely to occur on the network cable. The reason for this is that two or more of the collision participants will have exited Backoff and begun deferring during the transmission of the data frame. Consequently, those stations will stop deferring and immediately begin to transmit data frames/packets at the same time when the network cable goes quiet.

Figure 3:
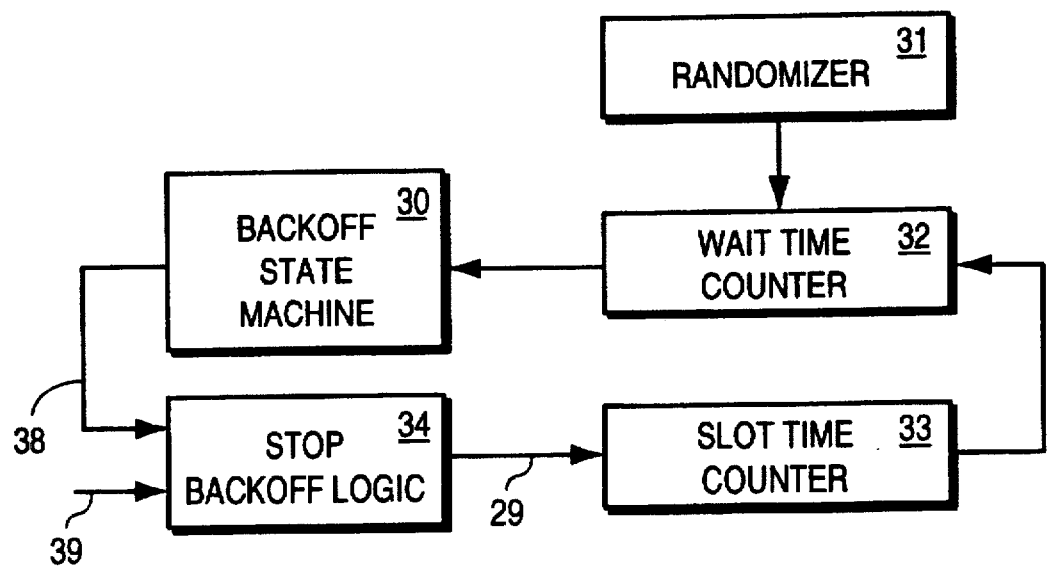
FIG. 3 illustrates a block diagram of the hardware that is used to implement the Ethernet backoff algorithm in one embodiment of the present invention.

Referring now to FIG. 3, a block diagram of the hardware used to implement the collision backoff algorithm of one embodiment of the present invention is shown. The hardware comprises: backoff state machine 30, randomizer 31, wait time counter 32, slot time counter 33 and stop backoff logic 34. Backoff state machine 30, randomizer 31, wait time counter 32 and slot time counter 33 function in the same manner described above. The improvement of the present invention lies within stop backoff logic 34.

Stop backoff logic 34 has two input signals: backoff signal 38 and carrier sense signal 39. Backoff signal 38 is active when the station controller is in Backoff. At all other times backoff signal 38 is inactive. Carrier sense signal 39 monitors the network cable for activity. When activity on the network cable is detected cable carrier sense signal 39 is active. When the network cable is quiet signal 39 is inactive. When input signals 38 and 39 are both active the stop backoff output signal 29 is inactive.

In the present invention when a collision is detected on the Ethernet network, the network controller at each station involved in the collision initiates the Ethernet backoff protocol and begins executing its binary exponential backoff algorithm. Randomizer 31, which comprises a 17 bit LSFR and a masking window, generates a random integer (r) in the range $0<r<2^k$, where $k= \min(n,10)$. The number generated by randomizer 31 is then loaded into wait time counter 32. Concurrently with selecting and loading the random number into wait time counter 32, backoff state machine 30 activates backoff signal 38. If carrier sense signal 39 is inactive when signal 38 is active, stop backoff logic 34 activates stop backoff signal 29 to enable slot time counter 33. While signal 29 is active, wait time counter 32 is decremented after the clocking of each slot time interval, as determined by slot time counter 33. If activity is detected on the network cable at any time while the station is implementing its backoff algorithm carrier sense signal 39 becomes active. As a result, stop backoff logic 34 deactivates signal 29 thereby freezing slot time counter 33. When the network cable is again quiet carrier sense signal 39 becomes inactive and stop backoff logic 34 activates signal 29 to enable slot time counter 33. When wait time counter 32 reaches zero counts, backoff state machine 30 enables the station's network controller to attempt retransmission of the data packet.

By freezing slot time counter 33 when activity is detected on the network cable, the present invention increases the overall throughput of the Ethernet network by reducing the likelihood that two or more stations will emerge from their respective collision backoff algorithms at the same time. The present invention does this by preserving the backoff time differential established between those stations involved in the initial collision event.

Although the present invention extends the amount of time that a station will backoff after experiencing a collision, the average amount of time for a station to recover from the initial collision event is actually reduced. As previously discussed, in accordance with the IEEE 802 standard, a station may attempt to retransmit a data frame a maximum number of 16 times before the retransmission of the data is aborted. Note, however, that the amount of time a station backs off increases exponentially after each attempted retransmission. Hence, by reducing the likelihood that a collision will occur when a station attempts to retransmit a data packet, the present invention also reduces the number of times a station will be required to retransmit before successfully transmitting a data packet. As a result, the recovery time between the initial collision of a data packet and its successful transmission is reduced.

Figure 4:
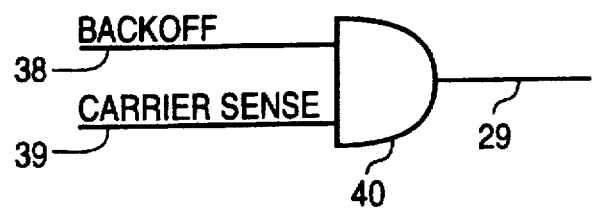
FIG. 4 is an electrical schematic of the Stop Backoff Logic in one embodiment of the present invention.

In one embodiment of the present invention the stop backoff logic comprises an AND gate as illustrated in FIG. 4. As previously discussed, the stop backoff logic, represented by AND gate 40, has two input signals 38 and 39. Backoff signal 38 is active when the station controller is in Backoff. At all other times signal 38 is inactive. Carrier sense signal 39 monitors the network cable for activity. When activity is sensed on the network cable signal 39 is active. When no activity is sensed on the cable signal 39 is inactive. As a result of logically ANDing signals 38 and 39, signal 29 is inactive when signals 38 and 39 are both active. Note also that when signal 38 is active and signal 39 is inactive signal 29 is active. As shown in FIG. 3, signal 29 serves as an input to slot time counter 33. When signal 29 becomes active, slot time counter 33 is enabled and begins clocking. When signal 29 becomes inactive, slot time counter 33 is disabled and freezes its clocking operation.

Figure 5:
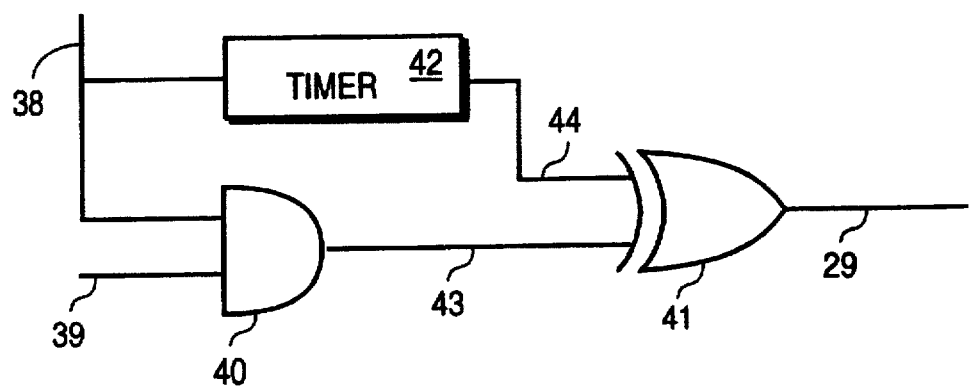
FIG. 5 is an electrical schematic of the Stop Backoff Logic in another embodiment of the present invention.

In another embodiment of the present invention a timer is added to the stop backoff logic. The timer begins clocking when the station controller initiates its backoff algorithm after experiencing a first collision of a data frame. When the timer times out after a predetermined amount of time it will, in effect, bypass the stop backoff logic and the backoff algorithm will solve all future collisions of the data frame using the old method. The embodiment comprises an AND gate 40, logical OR gate 41, and timer 42 as illustrated in FIG. 5. The embodiment functions in the following manner. When the network controller at a station initiates the Ethernet backoff protocol the controller's backoff state machine activates signal 38. As illustrated, signal 38 provides an input to AND gate 40 and timer 42. When activated, signal 38 enables timer 42 and the timer begins clocking. Timer output signal 44 is inactive and remains so until timer 42 has timed out. When timer 42 times out signal 44 becomes active. As previously discussed, carrier sense signal 39 becomes active whenever activity is detected on the network cable. When the network cable is quiet signal 39 remains inactive. As a result of logically ANDing signals 38 and 39, signal 43 becomes inactive when signals 38 and 39 are both active. Note, however, that when signal 38 is active and signal 39 is inactive, signal 43 is active.

As illustrated in FIG. 5, signals 43 and 44 serve as inputs to OR gate 41. As mentioned earlier, when timer 42 is clocking signal 44 remains inactive. During this time period the OR gate output signal 29 mimics signal 43. That is, when signal 43 is active signal 29 is also active. Conversely, when signal 43 is inactive signal 29 is also inactive. However, when timer 42 times out signal 44 becomes active and, as a result, signal 29 becomes active and remains active until the network controller terminates the execution of the backoff algorithm.

In one embodiment of the present invention timer 42 is set to time out in 60 to 100 ms. It should be understood, however, that the desired timer setpoint may vary from one network system to another. It is further understood that timer 42 may comprise a counter or any other suitable clocking device.

The invention has now been described with reference to specific embodiments. Other embodiments will be apparent to those of ordinary skill in the art. It is therefore intended that this invention not be limited, except as indicated in the appended claims.

What is claimed is:

1. In an Ethernet network having a line interconnecting a plurality of stations, an improvement for solving collisions comprising:

a first circuit at a first transmitting station for detecting a collision on said line of a first signal transmitted by said first transmitting station, said first circuit deferring the retransmission of said first signal from said first transmitting station for a random amount of time as determined by a first counter when said collision is detected;

a second circuit coupled to said first circuit and said line for stopping said first counter when a second signal is detected on said line; and a third circuit for bypassing said second circuit at a predetermined amount of time after said first circuit detects said collision.

2. The apparatus of claim 1, wherein said first circuit adheres to the requirements defined by the ANSI/IEEE Standard 802.

3. The apparatus of claim 1, wherein said first circuit includes a first timer and said first counter is included in said first timer.

4. The apparatus of claim 1, wherein said second circuit comprises a logical AND gate.

5. The apparatus of claim 1, wherein said third circuit comprises an exclusive OR gate.

6. The apparatus of claim 1, wherein said third circuit comprises a second counter and an exclusive OR gate.

7. The apparatus of claim 1, wherein said third circuit includes a second timer and said second counter is included in said second timer.

8. In an Ethernet network having a line interconnecting a plurality of media access units (MAUs), an improvement for solving collisions comprising:

a first circuit at a first MAU for detecting a collision on said line of a first signal transmitted by said first MAU, said first circuit deferring the retransmission of said first signal from said first MAU for a random amount of time as determined by a first counter when said collision is detected;

a second circuit coupled to said first circuit and said line for stopping said first counter when a second signal is detected on said line; and a third circuit for bypassing said second circuit at a predetermined amount of time after said first circuit detects said collision.

9. The apparatus of claim 8, wherein said first circuit adheres to the requirements defined by the ANSI/IEEE Standard 802.

10. The apparatus of claim 8, wherein said first circuit includes a first timer and said first counter is included in said first timer.

11. The apparatus of claim 8, wherein said second circuit comprises a logical AND gate.

12. The apparatus of claim 8, wherein said third circuit comprises an exclusive OR gate.

13. The apparatus of claim 8, wherein said third circuit comprises a second counter and an exclusive OR gate.

14. The apparatus of claim 8, wherein said third circuit includes a second timer and said second counter is included in said second timer.

* * * * *